April 27, 1948.                    J. J. ANTALEK                    2,440,565
                                TRANSLATING DEVICE
                              Filed Sept. 19, 1944
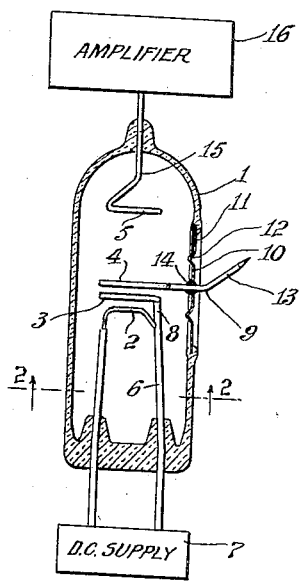
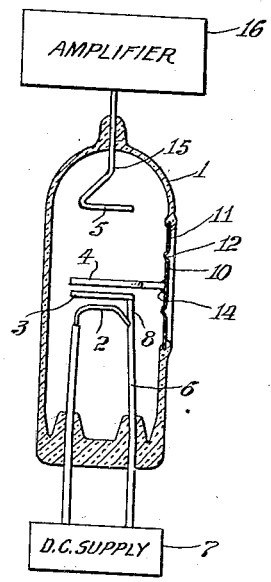
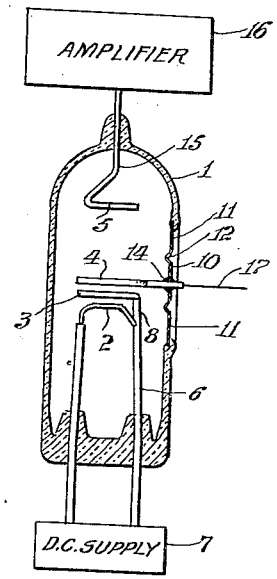
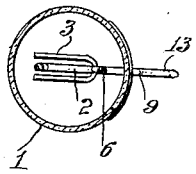
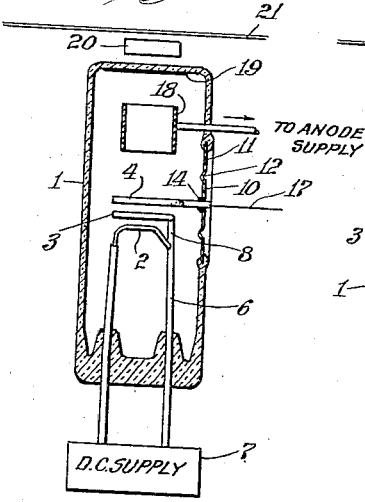
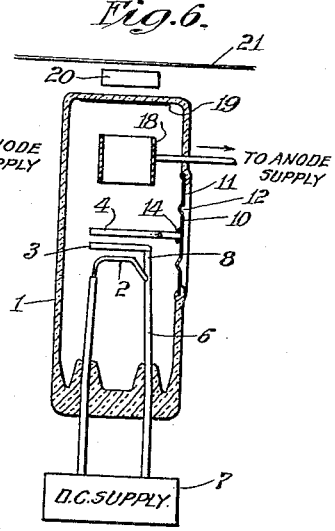
INVENTOR
John J. Antalek
BY Paul Kolisch
ATTORNEY Patented Apr. 27, 1948

2,440,565

UNITED STATES PATENT OFFICE 2,440,565

TRANSLATING DEVICE

John J. Antalek, Chicago, Ill., assignor to The Rauland Corporation, Chicago, Ill., a corporation of Illinois Application September 19, 1944, Serial No. 554,761

4 Claims. (Cl. 250—27.5)

This invention relates to new and useful improvements in electrical sound-translating devices, such as phonographic pickups, microphones and oscillographs, adapted to transform mechanical into electrical energy.

The objects of this invention are to provide a translating device which is relatively free of amplitude and frequency distortion, which is not subject to atmospheric variations, and which will require a minimum amplification.

With these objects in view, I provide the device in the form of an electric discharge tube, at least one of the electrodes of which is moved under the control of mechanical vibrations to vary the ionic or electronic stream in the tube in accordance with these vibrations.

The output of the tube, or at least a portion thereof, can be used, if necessary after amplification, in the form of a pickup to control a loudspeaker. In this case, at least one of the electrodes is controlled by a stylus engaging a phonographic record.

In another form of the invention, at least one of the electrodes of the tube is controlled by a diaphragm or diaphragms which are vibrated by sound waves, thus producing electrical waves which can be used to control a sound recorder of any type, a sound reproducer such as a public address system, a broadcasting station, or any other communication system.

Still another form of the invention is an oscillograph which can be used in the optical or phonographic registration of sound or any other type of mechanical vibrations. In this case, at least one of the electrodes is controlled by one or more diaphragms; the electrode or electrodes control one or more electronic beams producing a variable amount of exposure on a radiation-sensitive surface, such as a film, either directly, after having passed through a metal window in the tube, or indirectly, by impinging on a fluorescent screen within the tube.

A variable light line thus produced may be used to register the sound or any other mechanical vibrations on a photographic film passing the tube at a constant speed. Such a device is particularly useful in a portable sound film camera or a combined sound-picture camera which produces sound and picture on the same film with a minimum of equipment.

The device may also be usefully applied in seismographic or geological detecting devices in which mechanical vibrations of a desired frequency range passing through the various strata of the earth are translated into waves of electrical energy which permit the establishment of the exact location of these strata.

A further application of the invention is found in listening devices where portability and rapidity of operation are of particular importance.

The invention is not limited to the particular devices and applications disclosed and may be used in the detection of mechanical vibrations of any suitable frequency as will become apparent from the drawings and their description, and the appended claims.

A preferred embodiment of the invention is illustrated in Fig. 1 which represents a longitudinal cross section of a phonographic sound reproducer or an electrical pickup;

Fig. 2 represents a transverse section along lines 2—2 of Fig. 1;

Fig. 3 shows a modification representing a microphone device;

Fig. 4 shows a second modification of a microphone device; and

Figs. 5 and 6 show two modifications representing oscillographs for the recording of sound tracks of different types.

Referring to the drawings, and in particular to Fig. 1, 1 is an envelope of glass or other material suitable for vacuum tubes and the like. The space enclosed by the walls of the envelope 1 is evacuated or filled with an inert gas. Good results may be obtained by filling envelope 1 at atmospheric pressure. Four electrodes are provided within the envelope in cooperative relation with one another: a filament 2, a shield grid 3, a control grid 4, and an anode or plate 5. The filament is, in the present case, of the hairpin type, the connecting portion of which is substantially horizontal. The filament is connected with two lead-in wires 6 which pass through and are sealed into the bottom of envelope 1 and are connected to a supply of direct current 7.

The shield 3, as shown in Fig. 2, is in the form of a U-shaped wire which is fastened to an extension 8 of one of the lead-in wires 6. Shield 3 is adjacent filament 2 and its two legs are parallel with the horizontal connecting piece 2 of the filament which is in alignment with the longitudinal axis of shield 3. The control grid 4 is in the usual form of a perforated plate or wire netting adjacent to, and parallel with, the shield 3. The extension 9 of the grid 4 passes through a diaphragm 10, 11 of resilient material, such as "Kovar," aluminum foil or any other flexible, vacuum-tight material. The flexibility of the material may be caused, or be increased if necessary, by providing one or more corrugations 12 in the diaphragm 10, 11. They are of circular shape and surround stylus 13 dividing the diaphragm into an inner and outer portion 10 and 11. The outer portion 11 of the diaphragm is sealed into a circular opening in the side wall of envelope 1 while the inner or central portion 10 carries electrode 4 and stylus 13.

The diaphragm 10, 11 may consist of one piece or of two pieces, a relatively light, inner diaphragm 10 welded to a relatively heavy, outer diaphragm 11 sealed into the side wall of envelope 1.

The flexibility of the diaphragm serves to facilitate the accurate transmission of mechanical vibrations from the outside of the tube to an inner electrode and this increases the sensitivity of the device and reduces undesired resonance effect. In fact, the natural frequency range of the vibrating mechanism can be reduced. The oscillations of the system are damped so as to cause vibrations to follow the stylus as accurately as possible in the rhythm of the sound waves impressed upon it.

Both the diaphragm portions consist of the same or different materials, such as aluminum, "Kovar" or chrome nickel. The outer portion which is sealed into the wall of the envelope may be of annular shape and a relatively light and flexible inner diaphragm of circular shape is welded thereto. The heavier plate can be more easily sealed into the glass wall while the lighter plate can be easily attached to the heavier plate. In this way, a good and solid seal is obtained without interfering with the mechanical requirements of the vibrating elements.

It is not necessary that the vibrating portion of the diaphragm in itself be flexible but it is important that it be flexibly suspended and that it vibrate freely with respect to the wall or with respect to the heavier portion of the diaphragm. Very often, in order to prevent frequency distortion, it is required that the vibrating diaphragm be suspended so as to vibrate as a whole and be as rigid and as light as possible. In this way, not only resonance effects but also undesired harmonics may be reduced to a minimum.

The diaphragm or diaphragms should be preferably of a material having substantially the same thermal coefficients as the adjoining glass or metal part. "Kovar" is particularly recommended because it can be easily sealed in the glass envelope.

Where the extension 9 passes through portion 10, it is sealed thereto by silver solder, as indicated at 14.

The outside portion of extension 9 is attached to a stylus holder or to a permanent phonographic stylus 13 adapted to be set into the sound grooves of the phonographic record.

Anode 5 is connected through a lead-in wire 15 passing through the envelope 1 with an amplifier 16 arranged to amplify the output of the device to the extent to which this may be needed, in addition to the amplification effected by the reproducer itself. Preferably, the direct current supply 7 forms part of the amplifier to supply filament current to the tubes thereof as well as to the filament 2 of the reproducer.

As will be clear from the preceding, when the stylus 13 is vibrated under the control of the sound record, it will vibrate part 10 and control grid 4. The control grid will vibrate in a plane substantially parallel with the plane of shield 3 and, thus, vary the stream of electrons flowing from filament 2 to the plate 5 in accordance with the sound wave.

In Fig. 3, electrode or grid 4 is attached, welded or soldered directly to the inner surface of part 10 which is formed and arranged as the diaphragm of a microphone, and is vibrated, e. g., by sound. Grid 4 of the tube is caused to move in its plane perpendicular to the electron beam, thus preventing more or less electrons from reaching plate anode 5. In this way, the electrons reaching the anode are varied in accordance with the mechanical vibrations impressed on part 10.

Instead of using a diaphragm such as 10 as a direct receiver for the mechanical waves, a separate microphone diaphragm may be attached to its outer surface extending from part 10 perpendicular thereto similar to the arrangement of stylus 13 in Fig. 1; or such a stylus 13 may simply be replaced by a microphone diaphragm extending into the atmosphere perpendicular to part 10, as shown in Fig. 4, at 17.

In this case, modulations of the electron beam are caused by diaphragm 10 in a similar manner to those produced by stylus 13 in Fig. 1.

The electron beam produced by the filament 2 may be directed through a cylindrical or ring-shaped anode onto a fluorescent screen, as shown in Figs. 5 and 6.

In Fig. 5, a recorder tube is illustrated diagrammatically in which a diaphragm, while vibrating in the rhythm of sound waves, cuts off more or less from the width of the electron beam emitted from filament 2. Thus, after passing a cylindrical anode 18, it produces a spot of varying length on the fluorescent screen 19 mounted on the inside of tube 1. This spot is projected in a well-known manner through an optical system 20 onto the film 21 which runs at a constant speed past the tube 1 in a direction perpendicular to the optical axis of the system 20 or to the axis of the electron beam produced by the tube 1. In this way, a sound track of the variable area type can be produced on the film 21.

Fig. 6 shows a modification of Fig. 5 in which a diaphragm such as shown in Fig. 4 is used to produce electrode movements similar to those produced in Fig. 1. An electron beam controlled in this manner, after passing cylinder 18, is used to produce a light spot of varying intensity on the fluorescent screen 19 arranged on the inner side of the tube 1.

The light thus produced on fluorescent screen 19 is projected through an appropriate optical system 20 onto film 21, producing there a light line of constant area but of variable intensity resulting in a sound track of the variable density type, as is well known in the art of photographic sound recording.

The invention is not limited to the electrode controls shown. It is possible, for instance, to increase the output of the tube by including other electrodes, grids and plates in the tube, of any desired construction and arrangement, as is well known in the art of tube manufacture.

It is also possible to control the electron beam or beams by means of other electrodes of any desired shape arranged in the path of the electron beams, such as screen grids, deflection plates, anodes, etc. If required, not only one but several of such electrodes may be caused to vibrate in accordance with mechanical vibrations impressed upon these electrodes from the outside of the tube, without exceeding the scope of this invention.

If required, additional circuit elements can be built into the tube, such as additional amplifiers, to amplify still further the effect of the electrode control.

Not only amplifiers but also rectifiers, filters or any other circuit elements required for the faithful translation of mechanical energy into electrical energy may be inserted into, or connected with, the tube without departing from the spirit of this invention.

Also, if required, the tube may comprise a double insulating unit, each comprising a diaphragm in the wall of a cylindrical tube, preferably diametrically opposed to each other, with each diaphragm acting upon at least one electrode arranged in the path of an electron beam. Double units are well known in the art of tube manufacture where they are used to form powerful rectifier or amplifier valves.

A double unit, according to this invention, not only may be used to increase the output but also the two electron beams enclosed in one tube may be controlled in a different manner; for example, one diaphragm may be used to transmit one range of frequencies and another diaphragm another range of frequencies. In this way, a more faithful reproduction of the useful frequency range can be assured.

In sound recording, it would result in two parallel sound tracks of either identical shape if the two electron beams were controlled in the identical manner, or of different shapes if, for example, one electron beam were used to reproduce the lower frequencies of the audible range and the other electron beam were used to reproduce the higher frequencies of the electron beams.

Another possibility is to control one electron beam out of phase with, or in phase opposition to, the other electron beam to produce a sound record of the push-pull type. With a smaller phase difference between the two sound tracks, stereophonic effects may be obtained.

It is also possible, without exceeding the scope of this invention, to build in the tube rectifiers, filters, and any other electrical circuits necessary to transmit the mechanical energy impressed upon the tube into electrical or optical energy of a predetermined characteristic.

To produce, for example, sound records with as little background noise as possible, it is advisable to pass a portion of the electrical energy produced by the electron beam through a rectifier and to use this rectified component to bias the average intensity of the sound record in such a way that when no or little sound is recorded on the film, no or little light passes from the tube onto the film.

Such noiseless rectifier circuits may be arranged outside of tube 1 if a tube according to Fig. 1 is used to control an inside recorder but, if a tube as shown in Figs. 2, 3, 4, or 5 is used, a noise suppressor including a biasing rectifier and the circuits required therefor can be incorporated in tube 1 in order to obtain compactness and portability. In this way, the operative advantages of the tube are maintained while attaining a maximum of record fidelity.

What I claim is:

1. An electron discharge device for translating mechanical energy into electrical energy comprising means for responding to mechanical energy in a predetermined form to produce mechanical movements, an envelope enclosing means for producing a stream of electrons, means therebetween for receiving the stream, and movable electrode means responsive to movements to control the stream, said means for responding comprising a diaphragm mounted over an opening in said envelope, the diaphragm comprising a relatively heavy outer portion of annular shape sealed to the envelope, a relatively light inner portion of circular shape and a resilient circular corrugation between said two portions loosely coupling them together to permit the inner portion to vibrate freely with respect to the outer portion, and a movement-transmitting element connected between the inner portion and said electrode means.

2. An electron discharge device as in claim 1, in which the means for responding also comprises a stylus extending from said inner portion of the diaphragm, in space outside of the envelope, the stylus being connected and adapted to impart mechanical movements to the movement-transmitting element through the inner portion.

3. An electron discharge device as in claim 1, in which the envelope contains an inert gas at substantially atmospheric pressure.

4. An electron discharge device as in claim 1, in which the means for receiving comprising a fluorescent screen.

JOHN J. ANTALEK.

REFERENCES CITED

The following references are of record in the file of this patent:

UNITED STATES PATENTS

| Number | Name | Date |
|---|---|---|
| 1,548,095 | Osborne | Aug. 4, 1925 |
| 1,569,684 | Schwerin | Jan. 12, 1926 |
| 1,613,948 | Hartley | Jan. 11, 1927 |
| 1,831,977 | Sukumlyn | Nov. 17, 1931 |
| 1,871,253 | Bauer | Aug. 9, 1932 |
| 1,936,922 | Sukumlyn | Nov. 28, 1933 |
| 2,025,461 | Leonard, Jr. | Dec. 24, 1935 |
| 2,165,981 | Sampson | July 11, 1939 |
| 2,290,531 | Brett | July 21, 1942 |
| 2,389,935 | Rothstein | Nov. 27, 1945 |

FOREIGN PATENTS

| Number | Country | Date |
|---|---|---|
| 240,920 | Great Britain | Oct. 9, 1925 |

OTHER REFERENCES

Ser. No. 374,950, Schobelt (A. P. C.), published June 15, 1943.